United States Patent [19]

Littauer et al.

[11] 4,007,057
[45] Feb. 8, 1977

[54] CELL COMPRISING AN ALKALI METAL AND AQUEOUS ELECTROLYTE

[75] Inventors: Ernest Lucius Littauer, Los Altos Hills; Roger Paul Hollandsworth, Mountain View; Keh Chi Tsai, Saratoga, all of Calif.

[73] Assignee: Lockheed Missiles & Space Company, Inc., Sunnyvale, Calif.

[22] Filed: Dec. 29, 1975

[21] Appl. No.: 645,199

[52] U.S. Cl. .................................................. 429/57
[51] Int. Cl.$^2$ ............................................. H01M 6/04
[58] Field of Search ............... 136/83 R, 64, 100 R

[56] References Cited
UNITED STATES PATENTS

| | | | |
|---|---|---|---|
| 3,121,028 | 2/1964 | Story | 136/64 |
| 3,625,769 | 12/1971 | Lyall | 136/86 A |
| 3,791,871 | 2/1974 | Rowley | 136/100 R |
| 3,825,445 | 7/1974 | MacCarthy | 136/86 A |

Primary Examiner—John H. Mack
Assistant Examiner—H. A. Feeley
Attorney, Agent, or Firm—Richard H. Bryer; Billy G. Corber

[57] ABSTRACT

In a reactive metal-water electrochemical cell, an alkaline electrolyte containing soluble inorganic ions which are reduced preferentially to water at the cathode. More particularly, the additives substantially reduce or eliminate reduction of water and evolution of hydrogen at the cathode resulting in significant improvement in current efficiency, gravimetric energy density and cell potential at a given current. Additionally, suppression of hydrogen evolution makes possible a sealed system with venting of gases from the cell no longer necessary. The inorganic ions of the invention are nitrite, hypochlorite, chlorate, bromate, dinitrogen trioxide and sulfite ions which are formed when soluble salts of nitrite, sulfite, hypochlorate, bromate, chlorate, soluble gases such as dinitrogen trioxide and sulfur dioxide and other soluble inorganic compounds are dissolved in the alkaline electrolyte.

4 Claims, 4 Drawing Figures

4,007,057

CELL COMPRISING AN ALKALI METAL AND AQUEOUS ELECTROLYTE

BACKGROUND OF THE INVENTION

This application describes and claims several improvements in the basic electrochemical cell disclosed in U.S. Pat. No. 3,791,871, issued Feb. 12, 1974.

The basic mechanism of operation of the cell described in the aforementioned patent is incorporated by reference in this application. Briefly, the cell utilizes a reactive metal anode highly reactive with water and spaced from a cathode by an electrically insulating film formed on the anode in the presence of water. The anode and cathode are immersed in aqueous electrolyte. In the embodiment shown in the aforementioned patent the anode is formed of an alkali metal such as sodium or lithium and, during operation of the cell, the electrolyte is a liquid solution in water of an alkali metal hydroxide. Alloys and compounds of the alkali metals and other reactive metals should be equally feasible for use as the anode, however, provided they are substantially as reactive with water as are sodium and lithium and further provided, in common with sodium and lithium, they form an insulating film in the presence of water. The electrolyte is preferably an alkali metal hydroxide of the alkali metal utilized as the anode since such hydroxide is naturally formed during operation of the cell and hence automatically regenerates the electrolyte during operation. However, other alkaline electrolytes can be used to initially start up the cell or even during operation of the cell provided they permit the required anode-cathode reactions. Illustratively, potassium and ammonia hydroxide and alkali metal sulfates, halides and others are feasible. After start-up, these electrolytes will become replaced by the hydroxide of the anode metal unless subsequent additions of these electrolytes are made during operation of the cell.

Operation of the cell described in the aformentioned patent involves the following reactions, which for illustrative purposes, utilize lithium as the reactive anode and lithium hydroxide as the electrolyte:

| Anode Reaction | |
|---|---|
| 1. $Li \longrightarrow Li^+_{(aq)} + e$ | electrochemical dissolution |
| 2. $Li^+_{(aq)} + OH^-_{(aq)} \longrightarrow LiOH_{(aq)}$ | |
| 3. $LiOH_{(aq)} \longrightarrow LiOH_{(s)}$ | formation of insultating film on anode |
| 4. $Li + H_2O \longrightarrow LiOH_{(aq)} + \frac{1}{2} H_2$ | direct corrosion/parasitic reaction |
| Cathode Reaction | |
| 5. $H_2O + e \longrightarrow OH^- + \frac{1}{2} H_2$ | reduction of water | where (aq) represents water and (s) represents a solid salt.

Reaction (1) is necessary for the generation of electricity. Also necessary is an electron consuming reaction similar to reaction (5) but which, ideally, would not result in hydrogen evolution. Reactions (2) and (3) serve to produce the porous insulating film which forms on the anode and protects it. Electrochemical reaction (1) occurs at the base of the flooded pores, the metal-solution interface. Simultaneous with the formation of the film, lithium hydroxide sites at the film-solution interface dissolve into the bulk electrolyte. In order for the electrochemical reaction to proceed at a given constant rate, a steady state situation must exist whereby the electrochemically produced film dissolves into the electrolyte at the same rate as it is formed. Therefore, the electrolyte must have the capacity to dissolve solid salts from the anodic film-electrolyte interface simultaneously with the formation of the salt at the lithium-film interface. If the film dissolves more slowly than it forms, it becomes increasingly thicker and less porous and the electrochemical reaction rate slows down and can approach zero. If the film dissolves more rapidly than it is formed, then a higher reaction rate will result due to the thinner, more porous film. Ultimately, the film could disappear and the lithium become unstable.

Reaction (3) requires a sufficiently high concentration of lithium hydroxide at or near the anode to cause precipitation of f the film as solid lithium hydroxide on the lithium surface. Reaction (4) generates no useful electrical current. Co-pending U.S. patent application Ser. No. 564,984 describes the use of certain organic additives which inhibit the direct corrosion reaction (4).

Reaction (5) actually uses electrical energy and has the disadvantage of hydrogen evolution with its attendant relatively low voltage characteristics. The problem accordingly becomes one of introducing an alternate reaction which will produce the needed exchange of electrons without evolution of hydrogen and which increases efficiency and voltage of the cell.

SUMMARY OF THE INVENTION

Briefly, in accordance with the invention, it has been discovered that the use of certain soluble inorganic ions in the alkaline electrolyte of a reactive metal-water electrochemical cell permits a reaction which by substantially reducing or eliminating hydrogen gas evolution at the cathode permits the cathode reaction to occur at more electro-negative potentials thereby enhancing the overall cell potential.

The soluble inorganic ions of the invention are nitrite, hypochlorite, chlorate, bromate, dinitrogen trioxide and sulfite ions which are formed when soluble salts such as sodium and potassium salts of nitrite, sulfite, hypochlorite, bromate, chlorate, soluble gases such as dinitrogen trioxide and sulfur dioxide and other soluble inorganic compounds are dissolved in the alkaline electrolyte. There are many soluble salts of nitrites, sulfites and the like listed in chemical reference books such as Handbook of Chemistry and Physics, published by the Chemical Rubber Company. Naturally such compounds and gases must readily dissociate in the electrolyte to yield the desired ions, must have only minor inhibiting influence on the required anode-cathode reactions, should permit an acceptable reduction rate so as to avoid polarization, should not seriously detract from conductivity of the electrolyte, should have appreciable solubility in the electrolyte and, while not necessarily inert with respect to the reactive anode, should react therewith at a slower rate than water does. Additionally, the ions should be stable under operating conditions of the cell. Evaluation of the various inorganic compounds yielding these ions to ascertain whether they possess the preceding requiste characteristics is readily and easily accomplished and is within the skill of the art.

BRIEF DESCRIPTION OF THE DRAWING

The invention may be more easily understood from the following description and accompanying drawing in which.

DESCRIPTION OF THE PREFERRED EMBODIMENTS

Figure 1:
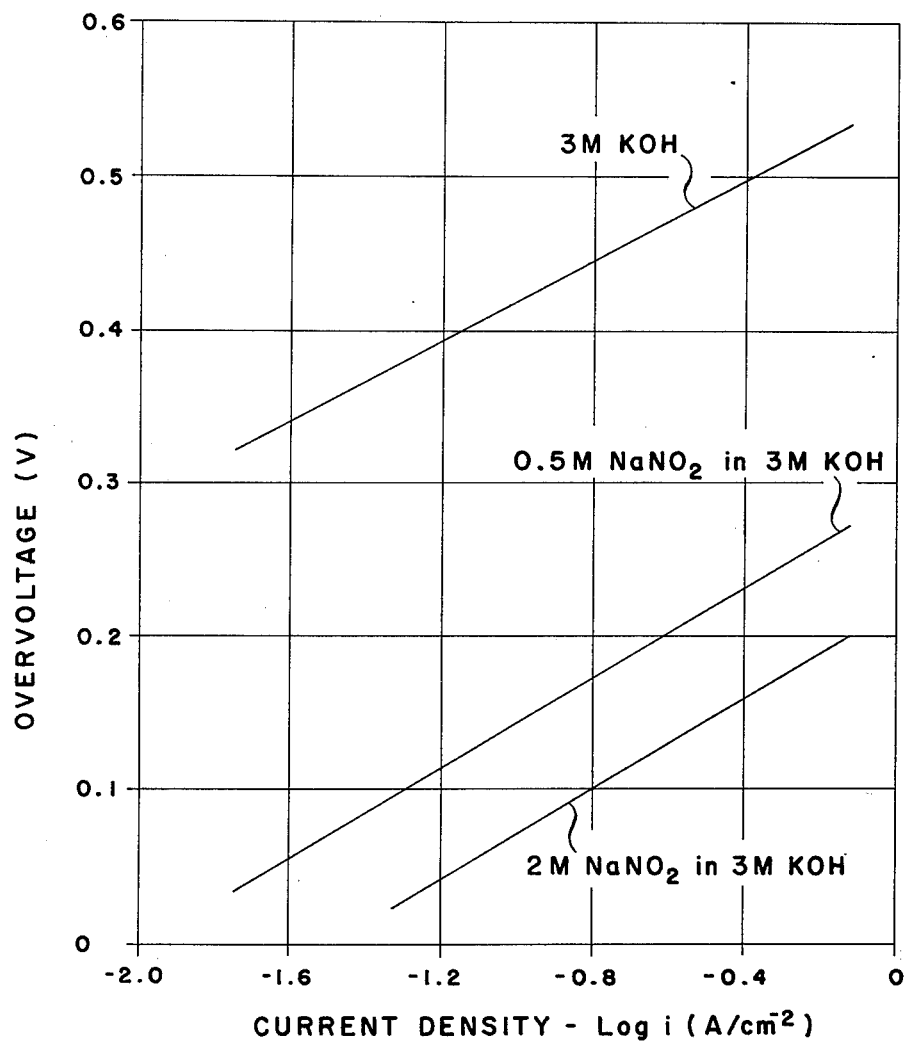
FIG. 1, on coordinates of overvoltage in volts and logarithm of current density in amperes per square centimeter, is a semi-log plot showing cathodic polarization as a function of nitrite concentration in potassium hydroxide electrolyte.

The use of the soluble inorganic ions of the invention in the alkaline electrolyte of a reactive metal-water electrochemical cell permits the required anode reactions (1), (2) and (3) previously discussed. However, the ions are electrochemically reduced at the cathode such that hydrogen solution (reaction 5) is substantially reduced or eliminated. The nitrite ion of the invention also suppresses the direct corrosion reaction (4). The addition of certain organic additives described in co-pending U.S. patent application Ser. No. 564,984 further suppresses reaction (4).

In certain electrochemical reactors, such as water electrolysis systems, hydrogen evolution is the normal cathode reaction and the liberated hydrogen is stored and used for various purposes. As such, attempts by the art to improve the efficiency of electrolyzers have typically been directed towards utilizing cathode reactants which permit the electrode reactions to occur with reduced polarization. Illustratively, E. C. Potter, in "Electrochemistry - Principles and Applications," Cleaver Hume Press Ltd., p. 135, teaches how additions of permanganates, chromates and nitrates lower the overvoltage in electrolytic hydrogen generators. However, in the experiment described by Potter, hydrogen evolution was still the cathode reaction. Bode, U.S. Pat. No. 2,538,078, also teaches the use of the chromate ion as a cathode reactant in a battery where the anode is zinc. The electrolyte contains lithium chromate and the cathode is carbon. Here, the chromate ion is reduced from the hexavalent state $Cr^{+6}$ to the trivalest state $Cr^{+3}$.

The art has utilized active cathodes in conventional batteries which actually participate in the overall electrochemical reaction. Here, the cathode reaction is not hydrogen evolution but the reduction of the cathode. However, such cathodes typically do not sustain a long duration discharge. For example, a silver chloride electrode has a capacity of only about 15 minutes at 400 $mA/cm^2$. As such, batteries of this type are not generally utilized.

In reactive metal-water batteries, as distinct from conventional batteries, hydrogen evolution is a problem since in an open air environment it can combine explosively with oxygen. In a submerged, marine environment, the evolution of hydrogen gas is visible and thus covert use of the battery is precluded. Applicants have overcome this problem by utilizing soluble nitrite, hypochlorite, chlorate, bromate, dinitrogen trioxide and sulfite ions in the alkaline electrolyte. These ions are relatively more electronegative than is the reduction of water (see W. M. Latimer, "Oxidation Potentials," Prentice Hall, Inc., New York, 1952) and satisfy the further requirements made necessary by the use of a reactive metal anode and an aqueous alkaline electrolyte. For example, while the iodate ion is more electronegative than the nitrite ion, its use is not desirable since it does not exhibit a low direct reaction with reactive metal anodes.

As previously discussed, the sulfite ion of the invention may be formed by the disassociation of sulfur dioxide gas in the alkaline electrolyte. U.S. Pat. No. 2,014,532 teaches the use of sulfur dioxide in an electrolyte but not to form sulfite ions to suppress hydrogen evolution. The battery comprises a lithium anode, a nonaqueous electrolyte consisting of lithium perchlorate and propylene carbonate and sulfur dioxide dissolved in the electrolyte which is reduced at the inert carbon cathode. Since the electrolyte is nonaqueous, the cathode reaction does not involve the reduction of water to hydrogen gas and hence sulfur dioxide is not utilized to give an ion which is reduced preferentially to water at the cathode.

As illustrative of the cathodic reaction involving the ions of the invention, in lithium hydroxide electrolyte, nitrite undergoes the following reactions at an inert nickel cathode in preference to the reduction of water:

Cathode Reaction

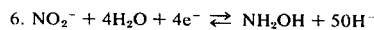

6. $NO_2^- + 4H_2O + 4e^- \rightleftarrows NH_2OH + 5OH^-$

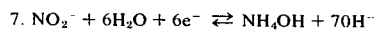

7. $NO_2^- + 6H_2O + 6e^- \rightleftarrows NH_4OH + 7OH^-$

Reaction (7) predominates at the cathode. The relatively high charge-transfer, four or six electrons being involved, indicates an extremely high energy density for this ion and, moreover, the ion, in common with other ions of the invention, does not produce hydrogen via reaction (5) previously discussed.

The improvement in voltage enhancement by utilizing the ions of the invention in the alkaline electrolyte of a reactive metal-water cell is illustrated by the following reactions where reaction (8) is illustrative of the typical anode-cathode reaction of the cell and reaction (9) illustrates the benefits realized by utilizing the ions of the invention:

8. Anode $\quad 2Li \longrightarrow 2Li^+ + 2e \quad\quad E° = -3.05V$

| | | |
|---|---|---|
| Cathode | $2H_2O + 2e \rightarrow 2OH^- + H_2$ | $E° = 0.83V$ |
| Cell | $2Li + 2H_2O \rightarrow 2Li^+ + 2OH^- + H_2$ | $E° = -2.22V$ |
| 9. Anode | $6Li \rightarrow 6Li^+ + 6e$ | $E° = -3.05V$ |
| Cathode | $NO_2^- + 6H_2O + 6e \rightarrow NH_4OH + 7OH^-$ | $E° = 0.17V$ |
| Cell | $6Li + NO_2^- + 6H_2O \rightarrow 6Li^+ + NH_4OH + 7OH^-$ | $E° = -2.88V$ |

The additional voltage in the amount of 0.66 volts and therefore the additional energy potential available with the ions of the invention are readily apparent from a comparison of reactions (8) and (9). Elimination of hydrogen gas as a reaction product also has significant advantages from safety considerations, gas separation problems from the electrolyte, and in single cell or multicell battery designs.

Co-pending U.S. patent application Ser. No. 580,303 discloses the use of soluble peroxide ions in an alkaline elecrolyte of a reactive metal-water cell as an anode moderator and a cathode reactant which suppresses hydrogen evolution. Such use of the peroxide ion, however, no way anticipates or renders obvious the instant invention since hydrogen peroxide breaks down into water components exclusively and hence it does not change the chemistry of the electrolyte. The materials of this invention do change the nature of the electrolyte.

Background data on the use of hydrogen peroxide as a cathode reactant in the alkaline solutions of prior art nonconsuming anode-fuel electrochemical cells is given in "Electrochemical Processes in Fuel Cells" by Manfred Breiter, Springer Verlag, New York, New York (1969). However, this use of hydrogen peroxide is even more remote from applicants' invention, since in the fuel cell art, hydrogen peroxide is reacted with a liquid or gaseous fuel. Thus, the hydrogen peroxide is reduced at an inert catalytic cathode surface such as silver or platinum and the counter reaction is the oxidation of say, methanol or hydrazine at an inert catalytic anode surface such as black platinum or carbon.

With reference to the drawing, the results thereon depicted were obtained utilizing an electrochemical cell in accordance with the aforesaid U.S. Pat. No. 3,791,871. For each run samples of lithium metal were rolled to 12.3 mm. thickness, cleaned with toluene, and cut into a 36 mm diameter disc with a die. This disc was cleaned on one side with sand paper to fresh metal and then pressed upon the anode holder. The side and back of the assembled anode was insulated with a polystyrene lacquer or with miccroflex stop-off lacquer. The electrode surface was then sanded to fresh metal, cleaned with toluene and then pretreated with a butyl chloride/benzene solution enabling fast activation of the power cell. The cathode was formed from iron screen 12×12 mesh with 0.58 mm diameter wire which was spot-welded to 0.76-mm deep ribs machined, with a spacing of 6.0 mm and a thickness of 1.2 mm, into a steel back plate. During runs electrolyte was circulated from the reservoir, maintained at a constant temperature, within ± 0.1° C, through a constant temperature heat exchanger, through the cell and returned to the reservoir by a micropump model 10-41-316 using voltage control. The flow rate was measured with a Brooks model 110 250-mm Full-View Rotameter having replaceable scales and floats for flow rate to 2.1 liters per minute or to 3.9 liters per minute. The volume of hydrogen gas evolved during reaction was separated from the electrolyte in the reservoir and then measured with an American Meter Co. Model 802 wet test meter with one liter per revolution. The meter was modified with an optical chopping disk to provide digital output for the wet test meter. The cell voltage and current were recorded on a Hewlett-Packard Moseley Autograf Model 7001 AM X-Y Recorder as the cell load was varied with a carbon pile resistor. A cadmium/cadmium oxide reference electrode, ($E = -0.809$ vs $H_2$) positioned in the cathode holder adjacent to the nickel cathode screen, was used to record anode and cathode voltage values as a function of current.

Referring more particularly to FIG. 1, there are plotted the results of tests to determine cathodic polarization as a function of nitrite concentration in aqueous potassium hydroxide electrolyte. In this figure, the voltage which has to be imposed upon the cathode for reaction to proceed (over-voltage) is plotted against the logarithm of the current density. This method of representing electrochemical data was first expounded by Tafel in 1905 (Zeitschrift Physikalische Chemie, 50, 641 (1905)). He showed empirically that the relationship $\eta = a + b \log i$ holds for electrochemical reactions. $\eta$ represents the overvoltage for the reaction i.e., the actual driving voltage minus the theoretical thermodynamic value, $i$ represents the current density (A/cm$^{-2}$) and a and b are constants.

From FIG. 1, it can be seen that the cathodic decomposition of 3 molar potassium hydroxide (to give hydrogen gas) occurs with much higher overvoltage than the same solution containing 0.5 molar sodium nitrite or 2.0 molar sodium nitrite. The reactant, $NO_2^-$, not only produced no gases but also gave much less polarization than that of water. This implies that a lithium-soluble reactant cell requires no vent and thus can be used in closed systems with much higher power obtainable. Normally, the lithium-water cell has to be operated as an open space system and the hydrogen gas produced at the cathode is vented. In obtaining these measurements, the electrolyte face velocity was 55 cm/sec. and the electrolyte temperature was 25° C.

Figure 2:
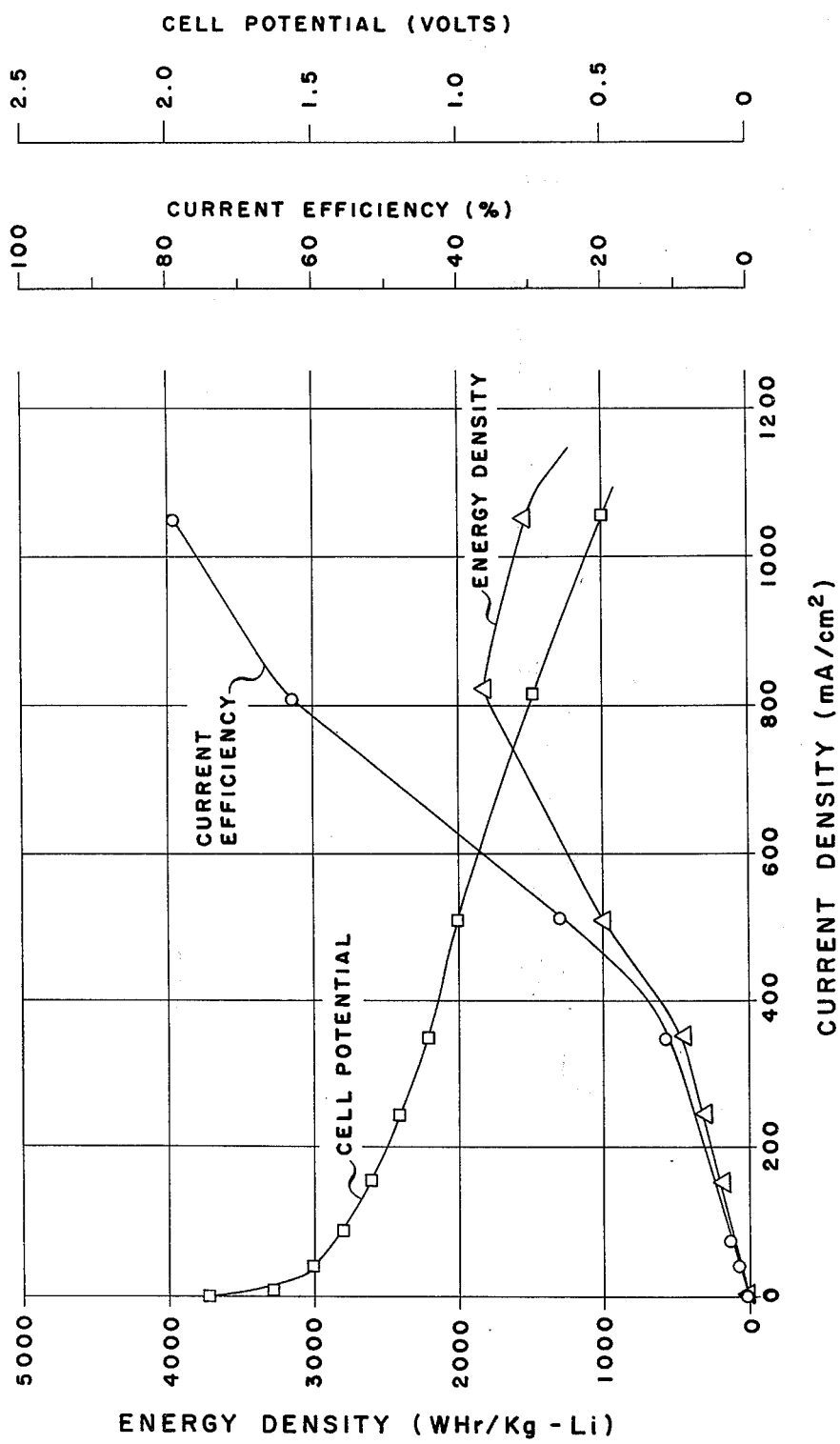
FIG. 2, on coordinates of energy density in watt hours per kilogram lithium, current efficiency in percent and cell potential in volts at the ordinate and current density in milliamperes per square centimeter at the abscissa, is a plot showing the performance features of lithium in 3 molar potassium hydroxide electrolyte.

In FIG. 2 there are plotted the performance features of lithium in 3 molar potassium hydroxide electrolyte. The cathode reactant in this cell was water, the electrolyte face velocity was 55 cm/sec., the electrolyte temperature was 25° C, and the contact pressure between the anode and cathode was 9 psi. As shown, the cell exhibited a relatively low current efficiency, energy density and cell potential. Hydrogen gas was produced at the inert iron cathode as a result of cathodic reduction of water in the electrolyte.

Figure 3:
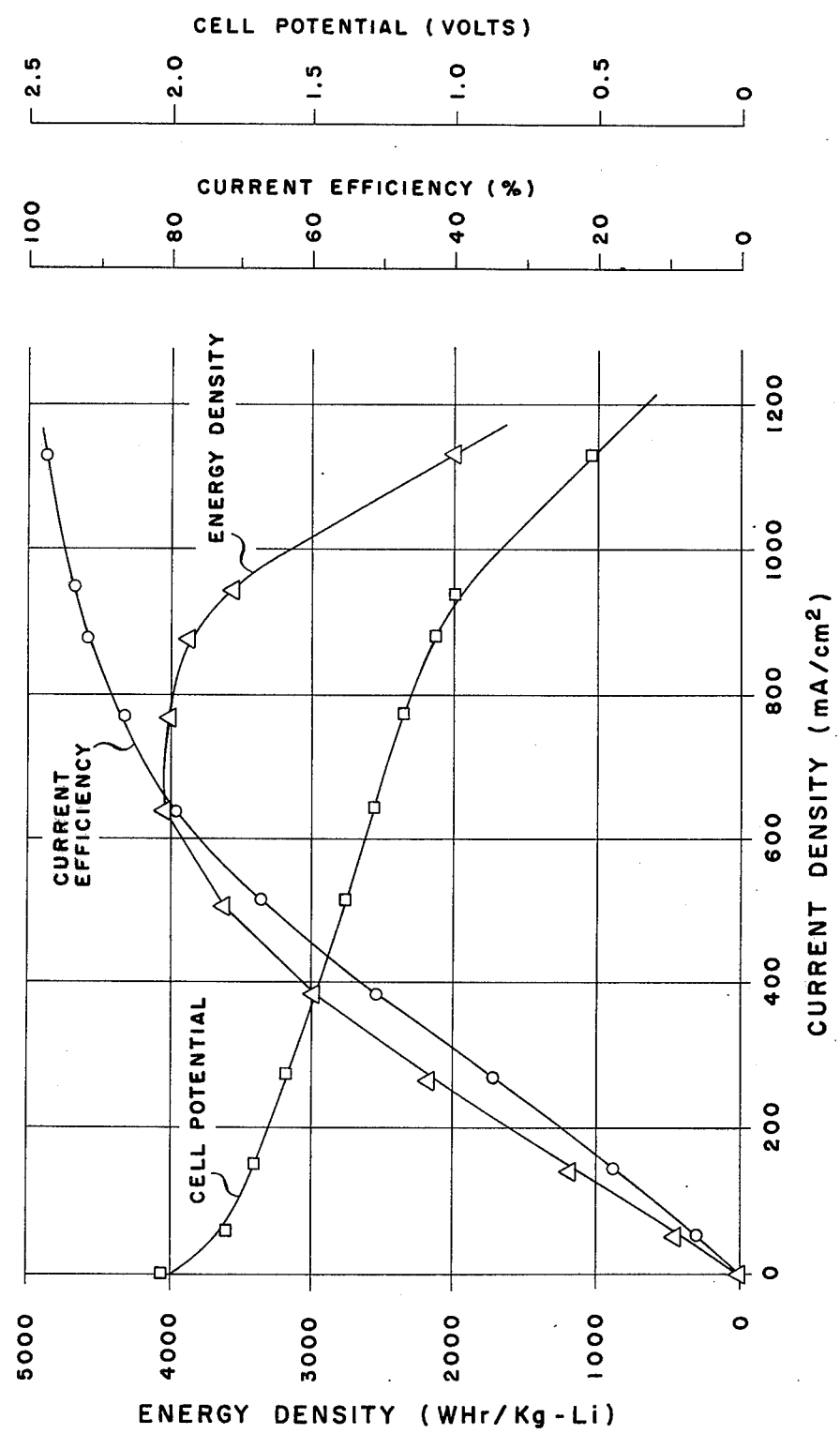
FIG. 3, on coordinates of energy density in watt hours per kilogram lithium, current efficiency in percent and cell potential in volts at the ordinate and current density in milliamperes per square centimeter at the abscissa, is a plot showing the performance features of lithium in 3 molar potassium hydroxide electrolyte containing 2 moles of sodium nitrite.

In FIG. 3 there are plotted the performance features of the cell depicted in FIG. 2 wherein the 3 molar potassium hydroxide additionally contains 2 moles of sodium nitrite. FIG. 3 clearly demonstrates the large improvement in current efficiency, energy density and cell potential at a given current that is obtained by using the nitrite ion of the invention as the cathode reactant instead of water. The cathodic reaction products are soluble in the electrolyte and no gas is evolved.

Figure 4:
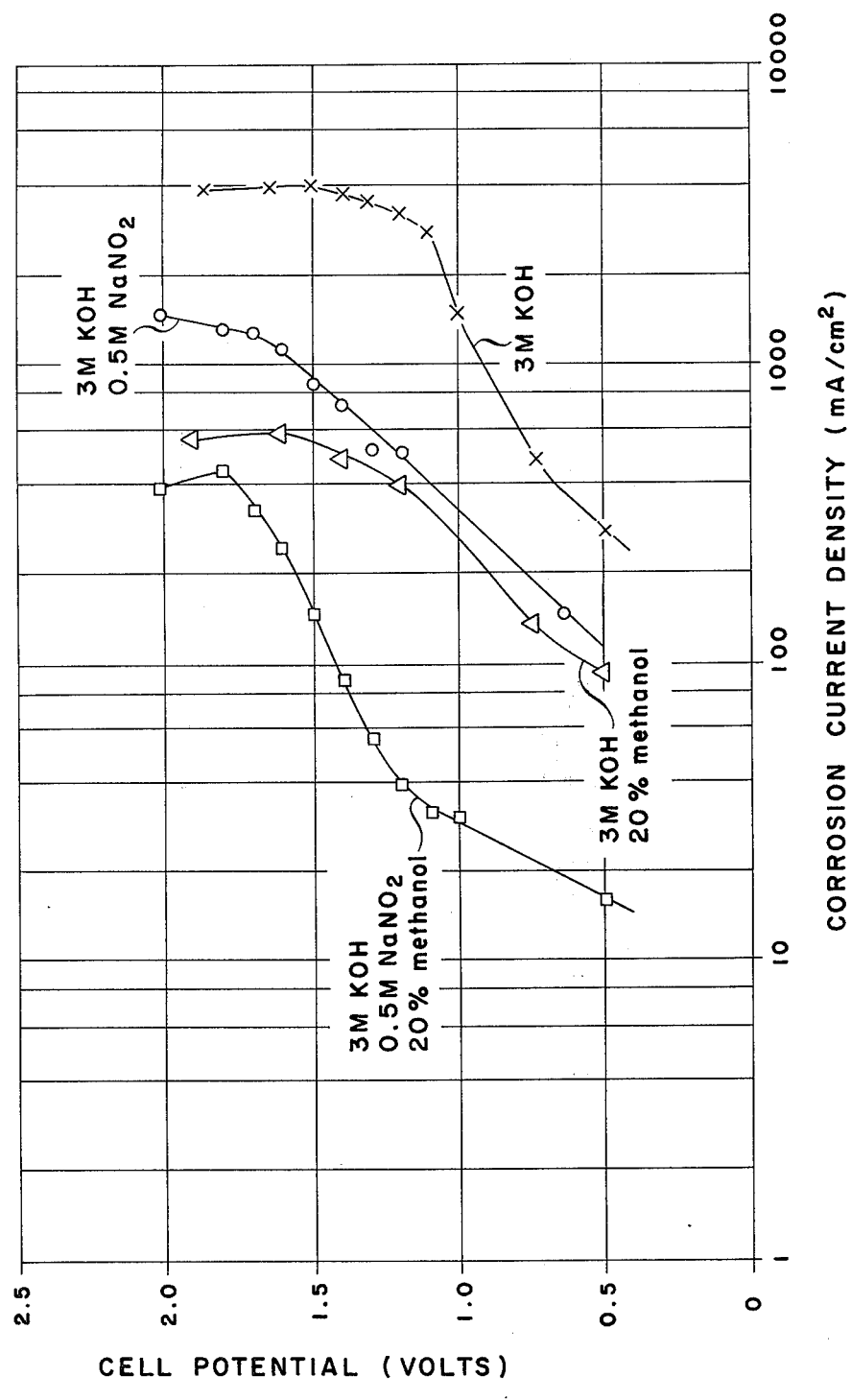
FIG. 4, on coordinates of cell potential in volts and corrosion current density in milliamperes per square centimeter, is a plot showing the direct corrosion/parasitic reaction of lithium with different electrolytes as a function of cell potential.

In FIG. 4 there is plotted the rate of direct corrosion/parasitic reaction of lithium with various 3 molar potassium hydroxide solutions at 25° C was a function of cell potential. The corrosion current was obtained from measurements of the hydrogen gas evolved at the anode since, except for the non-additive containing electrolyte, there was no gas evolved at the cathode. By application of Faraday's Law of Electrolysis to the corrected gas volume per unit of time, the corrosion current was calculated. This was then divided by the area of the lithium anode to give the current density. As shown, nitrite ions of the invention substantially suppress corrosion currents, methanol additions (in volume percent) as described in co-pending patent application Ser. No. 564,784 suppress corrosion even more and a combination of nitrite ions and methanol in the electrolyte obtains optimum suppression of corrosion currents. The greatest cell efficiency is obtained from a system where the corrosion reaction is reduced to minimal levels over as wide a range of operating voltage a possible.

The molarity of the alkaline electrolyte is dictated by the current density requirement of the system and the temperature of operation. Illustratively, low current density and high voltage operation require higher alkaline hydroxide concentrations, i.e., 4 molar and above. Likewise, high temperature system stability requires high molarity. High power, i.e., high current density, requires more dilute solutions. Lithium hydroxide electrolytes, for example, are typically utilized at concentrations from about 1.5 molar up to saturation, 5.3 molar. Generally, a concentration range of lithium hydroxide from 2 molar up to saturation is recommended.

In order to obtain an efficient operation of the lithium-inorganic soluble ion cell, it is recommended that the range of soluble ion concentration be from 0.2 molar to its respective saturation limit in lithium hydroxide electrolyte with the exception that hypochlorite concentration should not exceed 5 molar. If too low a concentration of cathode reactant is used, i.e., less than 0.2 molar, the performance of the cell may be degraded because of mass transport problems, namely, sufficient reactant is not available at the inert cathode to support the desired rate of electrochemical reduction. In this case, the current which can be drawn from the cell may be insufficient at any desired voltage. In the case of hypochlorite ion, 5 molar concentration should not be exceeded because internal cell heating problems are encountered at higher concentrations. Typically, excellent cell discharge can be obtained with all the reactants claimed if their concentration is in the range of 0.5 to 2 molar, and the aqueous alkaline electrolyte, e.g., lithium hydroxide, is in the range 3 – 4.5 molar.

What is claimed is:

1. An electrochemical cell consisting essentially of an alkali metal anode highly reactive with water and spaced from a cathode by an electrically insulating film formed on said anode in the presence of water, an aqueous alkaline hydroxide electrolyte in which said anode and cathode are immersed, said electrolyte permitting at the anode electrochemical dissolution of reactive metal to aqueous reactive metal ions and formation of an aqueous salt to a solid salt in the form of a porous film on said anode, and at least one soluble inorganic ion selected from the group of ions consisting of nitrite, hypochlorite, chlorate, bromate, dinitrogen trioxide and sulfite ions in said aqueous alkaline hydroxide electrolyte which is reduced preferentially to water at the cathode and substantially eliminates hydrogen evolution.

2. An electrochemical cell in accordance with claim 1 wherein
said soluble inorganic ion is selected from the group of ions consisting essentially of nitrite, hypochlorite, chlorate and dinitrogen trioxide ions.

3. An electrochemical cell in accordance with claim 2 wherein
said ion is nitrite.

4. An electrochemical cell in accordance with claim 1 wherein
said ion is selected from the group of ions consisting essentially of bromate and sulfite ions.

* * * * *